(12) United States Patent
Vertes

(10) Patent No.: US 8,230,399 B2
(45) Date of Patent: Jul. 24, 2012

(54) METHOD FOR SYSTEM CALL INTERCEPTION IN USER SPACE

(75) Inventor: Marc Vertes, Saint Lys (FR)

(73) Assignee: International Business Machines Corporation, Armonk, NY (US)

( * ) Notice: Subject to any disclaimer, the term of this patent is extended or adjusted under 35 U.S.C. 154(b) by 1328 days.

(21) Appl. No.: 11/867,296

(22) Filed: Oct. 4, 2007

(65) Prior Publication Data

US 2008/0250400 A1 Oct. 9, 2008

(30) Foreign Application Priority Data

Oct. 6, 2006 (EP) .................................... 06301024

(51) Int. Cl.
*G06F 9/44* (2006.01)
*G06F 11/00* (2006.01)

(52) U.S. Cl. .......................................... 717/128; 714/45

(58) Field of Classification Search .................. None
See application file for complete search history.

(56) References Cited

U.S. PATENT DOCUMENTS

| | | | |
|---|---|---|---|
| 6,047,124 A | 4/2000 | Marsland | |
| 6,526,567 B1 * | 2/2003 | Cobbett et al. ................ | 717/124 |
| 7,039,919 B1 | 5/2006 | Hunt | |
| 7,089,466 B2 | 8/2006 | Odom et al. | |
| 7,185,234 B1 * | 2/2007 | Thekkath ........................ | 714/45 |
| 2005/0033777 A1 * | 2/2005 | Moraes et al. ................ | 707/202 |
| 2006/0101415 A1 * | 5/2006 | Evans et al. ................... | 717/128 |
| 2006/0143536 A1 | 6/2006 | Grey | |

* cited by examiner

*Primary Examiner* — Li Zhen
*Assistant Examiner* — Evral Bodden
(74) *Attorney, Agent, or Firm* — Dennis Jung, Esq.; Kevin P. Radigan, Esq.; Heslin Rothenberg Farley & Mesiti P.C.

(57) ABSTRACT

A method is provided which includes: facilitating intercepting a system call in user space by setting up signal handler code for executing operations related to the system call, and performing in the executing process, before execution of the system call, a SELF PTRACE request which sets system and self trace flags in the operating system kernel, wherein the self trace flag facilitates self-notifying the executing process whenever the executing process executes the system call; and intercepting the system call, including: verifying by the kernel that the system and self trace flags are set; saving and sending a signal to the signal handler conveying system call information to the user space; starting execution in user space of the signal handler; and at the end of signal handler execution, re-starting execution of the executing process, while providing system call return information to code of the executing process making the system call.

16 Claims, 4 Drawing Sheets

METHOD FOR SYSTEM CALL INTERCEPTION IN USER SPACE

FIELD OF THE INVENTION

The present invention generally relates to method for intercepting system calls; more particularly this method allows interception of system calls from user space.

BACKGROUND OF THE INVENTION

Application level virtualization systems, which isolate an application from the underlying physical hardware for the purposes of protection (fault-tolerance), mobility (application relocation) through checkpoint and restart (with IBM MetaCluster operating on Linux, MetaCluster is a trademark of IBM Corporation in certain countries), deterministic replay, or simply resource isolation as Linux (Linux is a registered trademark of Linus Torvalds in the United States, other countries, or both) Vserver (Vserver is a trademark of Linus Torvalds in certain countries), Virtuozzo (Virtuozzo is a trademark of SWsoft in certain countries) OpenVZ, all have a need for intercepting and changing the original semantic of existing system calls.

One method to do this is to change the system call routine in the kernel to introduce system call interception and modification of the semantic. Performing the necessary changes inside the operating system is difficult, dangerous for the whole system stability and security, and generally not well accepted by users or maintainers, as it increases the kernel complexity and may compromise the integrity of the system and the ability to support it.

Some methods exist to insert code into a program to analyze its behavior, for example by collecting analysis data. This technique of modifying a program to make it analyze itself, is known as an "instrumentation method". An instrumentation method could be used to instrument the system calls, which could be modified in this way from the user space. However, the existing instrumentation methods perform well enough for debugging purpose, but cannot address high performance requirements, like those of fault tolerant systems.

The "ptrace" method for instrumenting executable code, as used by the Linux strace tool, requires an external controller process, which when notified by signal, stops, introspects, and then restarts the target process at each system call occurrence. The resulting performance overhead is huge, although this method is generic.

The LD_PRELOAD method, also an instrumentation of executable code, performs dynamically linked symbol interposition to intercept and substitute system calls which exist under the form of dynamic symbols. This method is limited to dynamic executables, and is not applicable if a system call is inlined in the library (because there is an associated symbol). Inlined syscalls are now more and more common in recent Linux standard libraries, which makes this method deprecated.

Machine code rewriting is another instrumentation method of executable code: the executable machine code is statically or dynamically rewritten, and when a system call is met, some additional code can be inserted to provide added value. This method doesn't support self-modifying executable code, and the performance overhead can also be very significant. An example is the ATOM product that was available on Digital Equipment Corporation workstations. ATOM inserts code, at compile time, into the program to be analyzed.

There is thus a need for a new method of intercepting all type of system calls during the execution of a program, and to modify their behaviour from user space, while avoiding performance overhead (unacceptable for fault tolerant systems), because kernel code is executed in privileged mode, and cannot be modified by the program.

SUMMARY OF THE INVENTION

It is an object of the invention to provide an instrumentation method for intercepting system calls and to modify their behaviour from the user space, which applies to any type of executable code, while maintaining a good level of performance.

This object is reached, according to claim 1, with a method for intercepting a system call in a process executing in user space and for executing operations in relation to the intercepted system call in user space, said method being executed on a computer wherein an operating system kernel supports ptrace system calls including a system trace, said method further comprising:

setting up in the executing process a signal handler comprising code for executing processing in relation with the system call to be intercepted;

performing in the executing process, before execution of the system call to be intercepted, a self ptrace request which sets a system trace flag and a self trace flag in the kernel;

upon execution of the system call, the kernel verifying that the system trace and the self trace flags are set;

the kernel saving system call information and sending a signal corresponding to the signal handler conveying system call information;

upon reception of the signal by the executing process, starting execution of the signal handler;

at the end of signal handler execution, restarting execution in the executing process at the next instruction following the intercepted system call while providing a system call return information.

This object is also reached, according to claim 2, with the method of claim 1 further comprising before the kernel sends a signal:

the kernel unsetting the system trace and the self trace flags.

This object is also reached, according to claim 3, with the method of claim 1 or 2 in which the step of performing a self ptrace request comprises:

saving the system trace flag and a self trace flag in the task descriptor of the executing process.

This object is also reached, according to claim 4, with the method of claim 1 or 2 in which the step of performing a self ptrace request further comprises:

saving the self trace flag in the task descriptor of the executing process and the system trace flag in the thread descriptor of the executing process.

This object is also reached, according to claim 5, with the method of any one of claims 1 to 4 wherein the step of the kernel sending a signal conveying system call information further comprises:

the kernel sending a signal conveying a system call identifier and arguments.

This object is also reached, according to claim 6, with the method of any one of claims 1 to 5 wherein the step of the kernel sending a signal corresponding to the signal handler further comprises:

the signal being one signal already used by the operating system and being modified from its initial use when the preceding steps are executed;

said signal being used unmodified by the kernel if the preceding steps of the method are not executed.

This object is also reached, according to claim 7, with the method of any one of claims 1 to 6 wherein the step of setting up a signal handler further comprises:

the signal handler comprising code for performing preprocessing or system call emulation or postprocessing.

This object is also reached, according to claim 8, with the method of any one of claims 1 to 6 wherein the step of setting up a signal handler further comprises:

the signal handler comprising code for virtualizing or debugging said executing process.

This object is also reached, according to claim 9, with a system comprising means adapted for carrying out the method according to any one of claims 1 to 8.

With the invention, when an executing program performs a system call, the system call notification mechanism of the kernel generates a signal. If a new PTRACE system call specific to the invention has been executed in an executing program, this signal is sent to the executing program itself, which can provide a user space signal handler to execute new code.

It is noted that even if the invention implements a new request to the existing PTRACE system call described in the Linux system reference manual, beside Linux, all UNIX systems already provide a 'ptrace-like' feature and have an existing system call notification mechanism (demonstrated by the existence of the strace or truss tools). This implies a portability of the services developed on top of the invention. As soon as the invention is implemented in a new UNIX system, services already developed in user space on a previous UNIX system become available to the new system.

All operating systems which have a debugger, which takes control of a process and forces a step by step execution, provide a ptrace system call or a similar mean, which can be modified as proposed, with the new PTRACE request embodiment. If a PTRACE system call does not exist, one other embodiment should be the creation of a specific service in the kernel, which would only perform the activation of system call notification, according to the solution of the invention.

The solution of the invention applies to any kind of executable (static or dynamic), supports inlined system calls, and system calls dynamically generated by self-modifying code.

The performance overhead of the notification is extremely low. It corresponds to half the cost of a signal interrupt. Because there is no additional task involved in the instrumentation, there are no additional context switches between tasks, nor additional inter-process communications. These characteristics warranty a good level of performance.

The other advantages of the solution can be listed as follows:

Beside a unique small and simple patch, no further modification is required in the kernel to support the interception and virtualization of the entire set of system calls.

This mechanism allows also a generalization of the concept, applying the method of the invention to non existing or unsupported system calls, which could be intercepted and emulated.

Safety: all services implemented on top of this interception mechanism reside in user space, in the context of the executing process, exactly as a regular dynamic library. They are not dangerous for the operating system or external application. There is no risk of crashing the kernel.

Development speed: the virtualization, the checkpoint/restart, record/replay, or other services can now be developed in user space, without having to tamper with system internals, nor to reboot. There is much more flexibility and possible access to a large variety of existing services at user level.

Security: the existing process security model is preserved. No internals of the kernel or other processes is made accessible to the process. Similarly, the process does not disclose any information to other entities. The security assessment is extremely simple to do, as the kernel modification consists only in a self-notification by signal.

DETAILED DESCRIPTION OF THE PREFERRED EMBODIMENT

Figure 1:
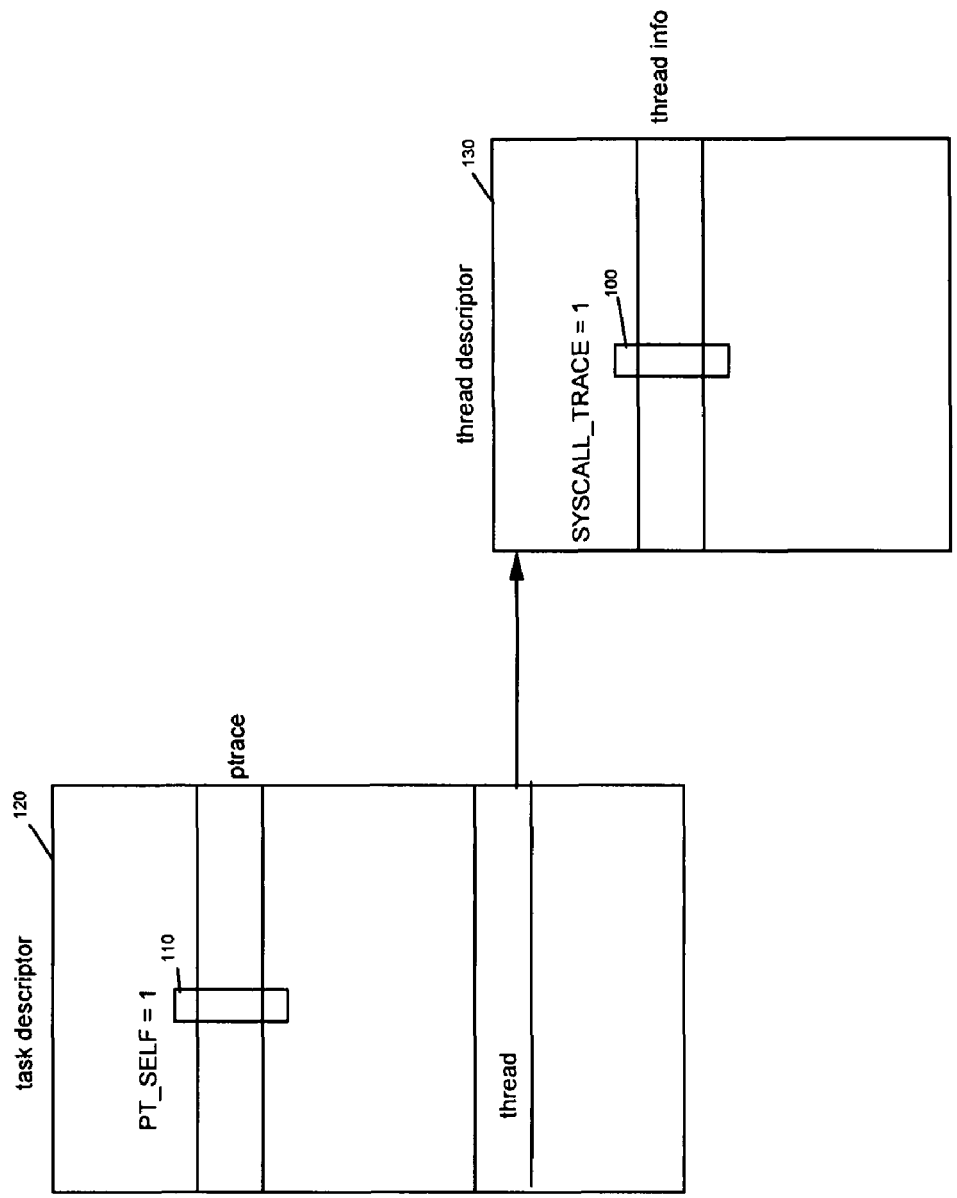
FIG. 1 describes the result of execution of PTRACE system call with a SELF_PTRACE request according to the preferred embodiment.

Implementing the method of the preferred embodiment requires using the syscall trace routine of the kernel of an operating system implementing a tracing of system calls with ptrace. As stated sooner in this document, Linux can be taken as an example of such an operating system, but most operating systems today, including embedded operating systems, provide a ptrace system call, and the tracing of system calls with ptrace, in their kernel. In the following, even if the Linux syntax is used to illustrate the solution of the preferred embodiment, both the ptrace system call and the processing of system calls which are described, are similarly implemented in other operating systems.

Linux and other Unices instrument the user/kernel boundary with the ptrace system call, which provides a user-space controller visibility and control on another (controlled) process. The controller process is notified whenever the controlled process is about to receive a signal, enter a system call, or exit from it. The controlled process is stopped just prior the event, giving the controller an opportunity to catch and forward the signal, to inspect or modify the controlled process memory and registers, and finally to let the controlled process resume the normal processing of the event. This is used for program debugging purpose or for tracing of system calls.

The existing ptrace syntax used in the process to be traced is the following:

include <sys/ptrace.h> long int ptrace(enum_ptrace_request request, pid_t pid, void*addr, void*data)

where 'request' defines the action to be performed. For example, the request PTRACE_TRACEME executed by the ptrace system call tells the kernel that the calling process wants to be traced. The 'pid' parameter, used by other requests, is the id of the active process to be traced; 'addr' is the address in the user area of the traced process that the controller process will read; 'data' is a data from the tracing process area that will replace traced process information at the address addr. The PTRACE_SYSCALL request is used without arguments, it makes the process to be traced to stop after the next system call.

The existing PTRACE_SYSCALL request sets the SYSCALL_TRACE flag in the kernel context of the controlled task, indicating that system call tracing is requested. Then, when the traced process executes the next system call, the system call routine of the kernel tests if the SYSCALL_TRACE flag is set. If the flag is not set, then the system call is executed. If the flag is set, the syscall trace routine is executed: the process is stopped and a signal is sent to the controller process, which will be able to access information from the kernel about the syscall performed by the traced process.

According to the preferred embodiment, a new ptrace request, SELF_PTRACE, is implemented in the Linux kernel by modifying the existing syscall-trace routine, which is executed in the kernel when a PTRACE_SYSCALL request has been performed by the controller process. The existing PTRACE_SYSCALL request is used by a controller process to intercept a system call in a controlled process. It allows, for instance, to look, at the system call arguments from the controller process, and possibly change them. In the preferred embodiment, a modification of the syscall-trace routine is proposed aiming at self-notifying a process with a signal allowing the process to interpose itself on its own system calls from the user space. The new ptrace request, SELF_PTRACE is added to the kernel. It has the capacity to notify the process itself through a signal whenever it executes a system call. Then, the interception and, for instance, the virtualization of the system call may be performed in a signal handler, in user space. A specific procedure (320 in FIG. 3 later in the document) is provided to resume transparently from the signal handler and propagate the (real or emulated) system call return value to the calling code. In summary, the method, implemented by adding a simple patch in the kernel, and a signal handler in user space, allows interposing on system calls from user space.

The syntax of the ptrace system call for this request is as follows; it does not use any parameter of the ptrace system call:
include <sys/ptrace.h>
long int ptrace(enum_ptrace_request SELF_PTRACE)

FIG. 1 describes the result of execution of PTRACE system call with the SELF_PTRACE request according to the preferred embodiment. The PTRACE system call is executed in the process executing in the user space for which a system call needs to be intercepted and modified from the user space. This flow chart is described in Linux environment. As with SYSCALL_TRACE request, the SYSCALL_TRACE flag (100) is set in the context of the process, saved in the kernel. A new flag, so called PT_SELF flag (110) is also set in the context of the process to indicate that a self tracing mechanism is armed for the process. For performance reasons in Linux, it is preferable to set the PT_SELF flag in the ptrace field of the kernel task descriptor (120) of the current task corresponding to the process and the SYSCALL_TRACE flag in the thread info structure (130) of the task descriptor.

Figure 2:
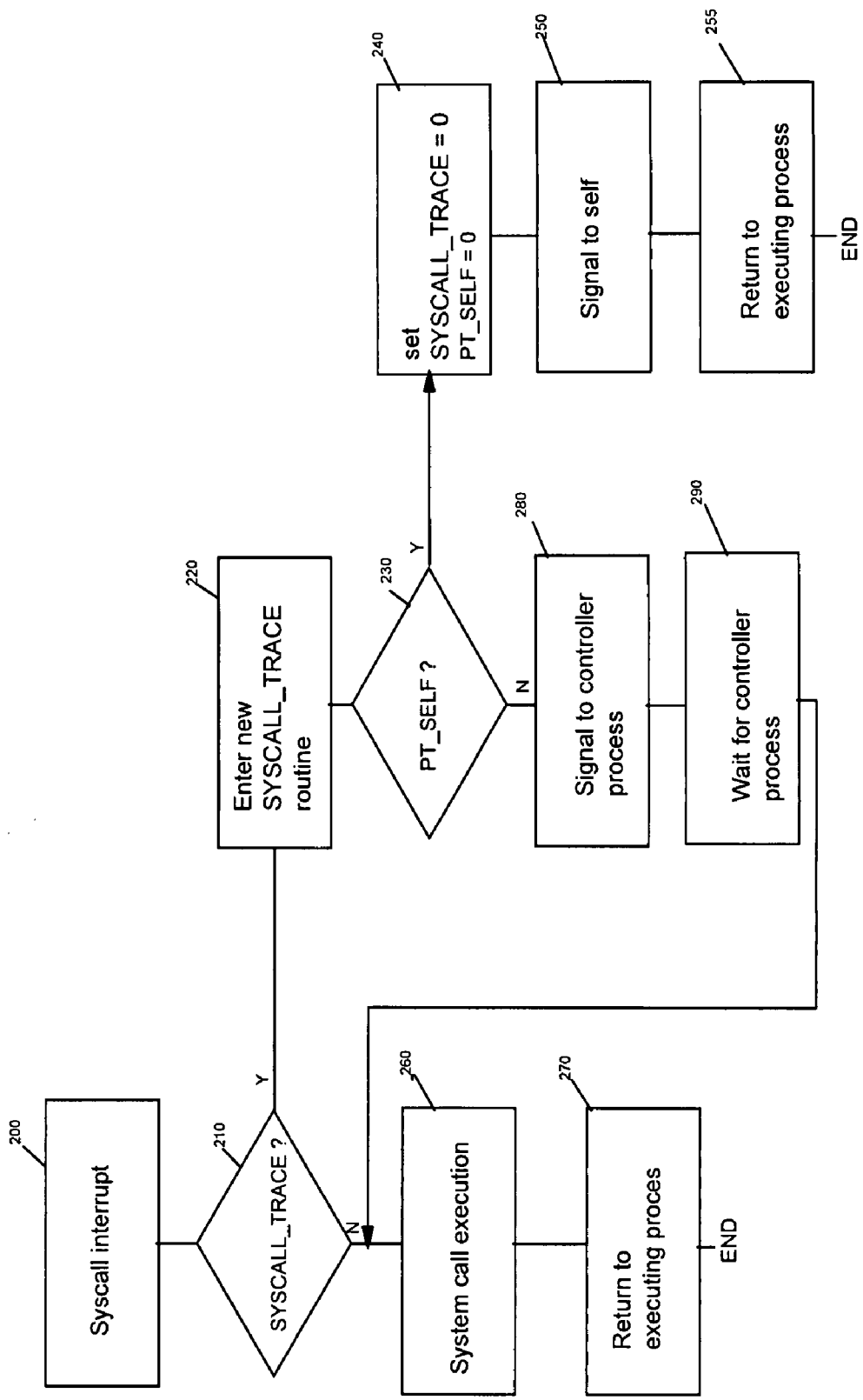
FIG. 2 is the flow chart of the system call entry as modified according to the method of the preferred embodiment.

FIG. 2 is the flow chart of the system call entry as modified according to the method of the preferred embodiment. For a process for which the system call needs to be intercepted and modified in the user space, a self trace mechanism has been armed by execution in said process of a SELF_PTRACE request ptrace system call. According to the preferred embodiment described with regards to the preceding figure, this means that at the execution of the SELF_PTRACE request of a ptrace system call, the SYSCALL_TRACE and the PT_SELF flags have been set in the descriptor of the process saved in the kernel space. The process executes normally until a system call is invoked. As usual, in any operating system, it calls a software interrupt (200) to the kernel and the kernel will execute the system call after examining the system call arguments. Before executing the system call the kernel looks in the task descriptor if the SYSCALL_TRACE flag is set (210). If the answer is No (SYSCALL_TRACE flag is equal to 0), the system call is executed (260) and the result is returned to the process which resumes execution in user space (270). If the answer is YES (SYSCALL_TRACE flag is equal to 1), the kernel executes the SYSCALL_TRACE routine (220). The SYSCALL_TRACE routine has been modified according to the preferred embodiment by adding a test of the PT_SELF flag (230). If the PT_SELF flag is not set (it is equal to 0), the existing SYSCALL_TRACE routine is executed: a signal is sent to the controller process (280) which had previously performed a wait system call. This signal conveys SYSCALL_TRACE result allowing the controller process to execute operations on the result. The kernel waits for controller process completion (290). When the controller process requests restarting the traced process execution, the system call is executed (260) for the traced process and the result is given back to the traced process which resumes execution in user space (270).

According to the preferred embodiment, if the PT_SELF flag is set, this means that a self ptrace has been required in the executing process and the first step consists in disarming the self ptrace process for the next coming system call in the executing process. This will avoid recursion. The SYSCALL_TRACE and the PT_SELF flags are thus reset to 0 (240) in the descriptor of the executing process. Then, a SIGSYS signal is sent by the kernel to the process itself (250). This is the great change compared to the PTRACE normal process, which does not advise the executing process itself but a controller process of the executing process (280).

The SIGSYS signal has been chosen because, by convention, the SIGSYS signal on Linux is used to convey notification information of bad completion of a SYSCALL ptrace system call. In the case of a 'bad system call' use of the SIGSYS signal, the information conveyed with the signal is the address where the bad system call has been generated. In the preferred embodiment, the SIGSYS signal conveys the information (system call number and arguments) necessary during execution of the processing of the intercepted system call which will be performed by a signal handler as described later in the document in relation with FIG. 3. Then, the kernel hands over control to the process (255).

It is noted that any software interrupt signal available in an operating system can be used (there are 64 possible signals in the Linux operating system, for instance) to implement the invention. However, the way the signal is used must allow the conventional use of the signal. For instance, in the case where the signal used for the implementation of the invention is SIGSYS signal, whenever a SYSCALL_TRACE routine is executed, the signal conveys the address where the bad system call has been generated to the controller process.

Figure 3:
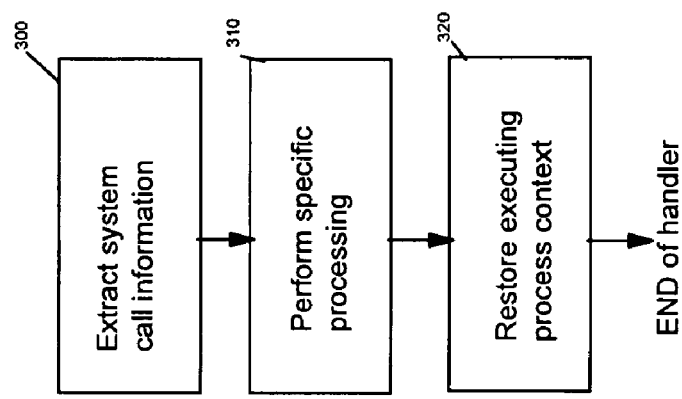
FIG. 3 is the flow chart of the signal handler executing in the user space according to the method of the preferred embodiment.

FIG. 3 is the flow chart of a signal handler according to the preferred embodiment. Processing related to the intercepted system call is executed in the user space as a signal handler of the process. A signal handler has been set up during execution of the process before a system call to be intercepted is executed. So, when the SIGSYS signal has been received by the executing process and the kernel hands over control to the process, the signal handler is executed. The following steps are executed in the signal handler:

Extracting (300) system call number and arguments: they are stored in the saved registers as a part of the signal context, automatically set by the kernel before sending the signal according to the preferred embodiment. As known from existing signal handler processing, the signal context address is passed on the stack to the handler as the 3rd argument according to the standard processing in Linux for signal handlers (one can refer to the Linux manual page of sigaction). As in the standard processing of signal handlers, the signal handler will use the signal context instruction counter to return after execution to the next instruction following the intercepted system call in the executing process.

Performing (310) any preprocessing, system call emulation, post-processing using system call number identifying the system call and system call arguments, as required, for instance, by virtualization or debugging services. As the SYSCALL_TRACE flag and PT_SELF flag have been cleared in kernel before sending the signal, all subsequent system calls performed by the application will not be intercepted. This avoids recursion problems.

Restoring (320) the context of the executing process using the received context data (sigcontext with Linux), with two changes: forcing the wanted system call return value in the dedicated register (eax register on Intel processors, Intel is a trademark or registered trademark of Intel Corporation or its subsidiaries in the United States and other countries), jumping directly to the next instruction following the system call interrupt, in the calling code (the instruction pointer register value+2, on Intel processors).

Consequently, as desired, by adding a new ptrace request in the ptrace system call service, and modifying (by addition of steps 230, 240, 250, 260) the SYSTEM_TRACE ptrace request in the kernel of an operating system, the following operations of:
    interception of a system call in one executing process, changes to this system call and,
    adding operations such as debugging, journaling, or virtualizing the application to which the executing process belongs,
are performed in a signal handler of the process and thus in user space. This same method can apply to control any system call execution from user space.

Figure 4:
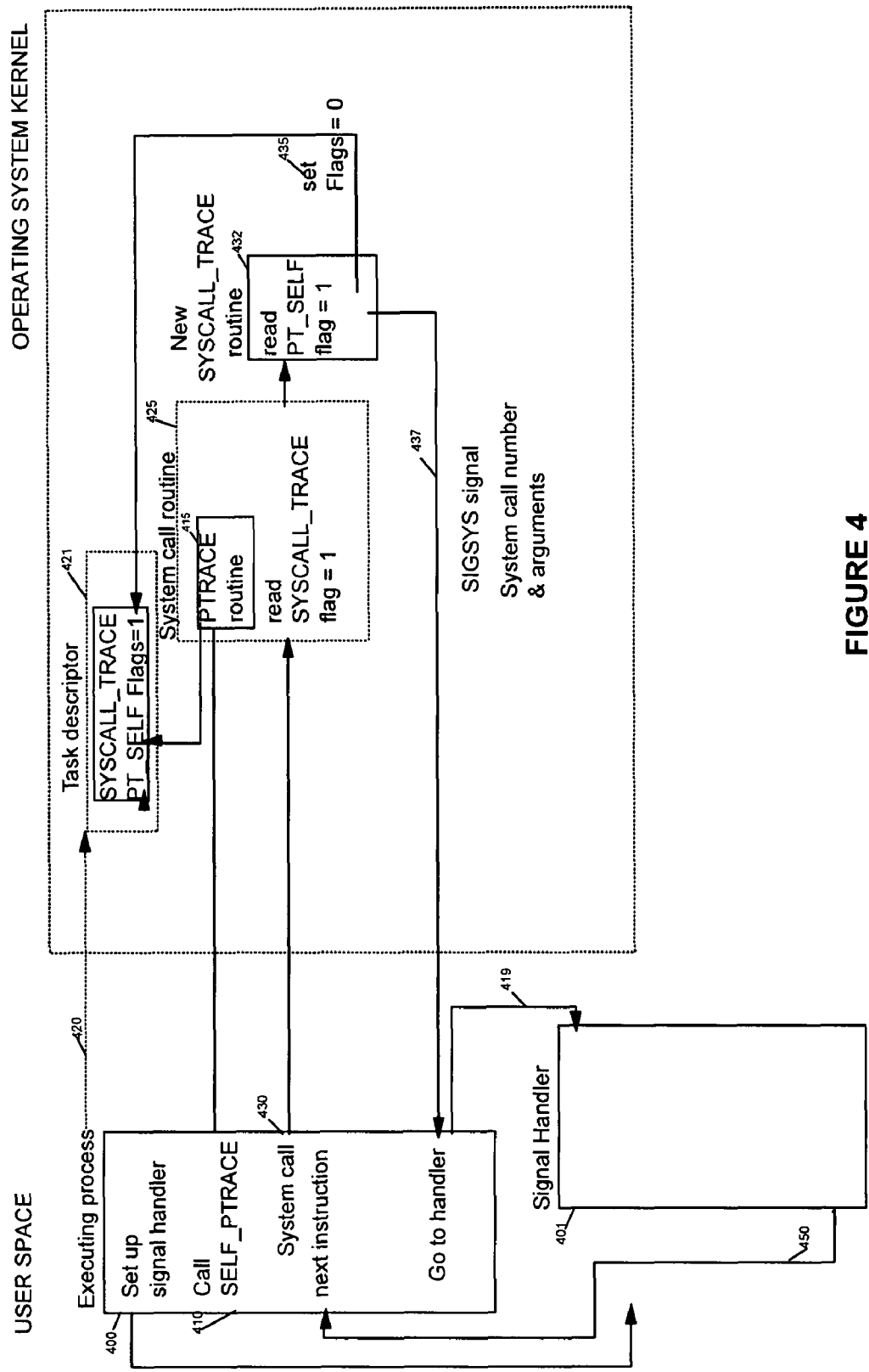
FIG. 4 illustrates the various components in the user-space and the operating system according to the preferred embodiment of the invention.

FIG. 4 illustrates the various components in user-space and in the operating system according to the preferred embodiment of the invention. The process executing in the user space needs to have a system call intercepted and modified in the user space. The kernel of the operating system which is in charge of task management saves (420) the context of the executing process as a task descriptor (421) in the kernel space. According to the preferred embodiment, the code of the process performs setting up of a signal handler (400). The handler code contains all the processing needed to be done in relation with the system call which needs to be intercepted: this processing may concern debugging or virtualization operations. The code of the executing process performs a ptrace system call (410) with the SELF_PTRACE request. The system call routine (425) in the kernel routes the system call to the ptrace service routine (415) which is executed in the kernel for this request: two flags, the SYSCALL_TRACE and the PT_SELF flags are set in the task descriptor. When a system call is performed by the executing process (430), the system call routine (425) checks that the SYSCALL_TRACE flag is set and routes the call to the new SYSCALL_TRACE routine (432) which sets (435) the two flags of the task descriptor to zero and sends (437), in one embodiment, a SIGSYS signal with information on the system call. Upon issuance of this signal, the kernel restarts process executing in the user space. As a signal handler has been set up, the signal handler starts execution (419) of the signal handler in the user space. The signal handler performs the processing in relation with the system call. At the end of signal handler execution, the executing process restarts (450) at the next instruction following the system call. In FIG. 4, dotted line boxes frame existing components as new or modified components are framed with full line boxes. It is visible from FIG. 4 that the method of the invention is implemented in the kernel by creation of a new SYSCALL_TRACE routine and a new request in ptrace service routine which set flags in the task descriptor. The remaining part is implemented in the user space by adding a set up of a signal handler and a self ptrace system call in the executing process and a signal handler.

The invention claimed is:

1. A method for interposing on a system call from user space, the method comprising:
    facilitating intercepting the system call in a process executing in user space of a computer by:
        setting up in the executing process of the computer, before execution of the system call to be intercepted, a signal handler comprising code for executing operations in relation to the system call to be intercepted, the code allowing the executing process to interpose itself from user space on the executing process' own system call;
        performing in the executing process, before execution of the system call to be intercepted, a SELF PTRACE request which sets a system trace flag and a self trace flag in an operating system kernel of the computer, the operating system kernel of the computer supporting ptrace system calls, including a system trace, the self ptrace flag facilitating self-notifying the executing process itself whenever the executing process executes the system call; and
    intercepting the system call of the executing process by executing processing in relation with the system call, the executing comprising:
        upon execution of the system call, the operating system kernel verifying that the system trace flag and the self trace flag, indicative of prior execution of the SELF PTRACE request in the executing process, are set;
        the operating system kernel saving system call information and sending a signal to the corresponding signal handler set-up in the executing process, the signal conveying system call information to user space;
        upon reception of the signal by the executing process, starting execution of the signal handler of the executing process in user space;
        at the end of signal handler execution in user space, restarting execution in the executing process at the next instruction following the intercepted system call while providing system call return information to calling code of the executing process making the system call.

2. The method of claim 1 further comprising before the operating system kernel sends the signal:
    the kernel unsetting the system trace and the self trace flags.

3. The method of claim 2 in which the performing the SELF PTRACE request comprises:
    saving the system trace flag and the self trace flag in a task descriptor of the executing process.

4. The method of claim 2 in which the performing the SELF PTRACE request further comprises:
    saving the self trace flag in a task descriptor of the executing process and the system trace flag in a thread descriptor of the executing process.

5. The method of claim 4 wherein the operating system kernel sending the signal conveying system call information to user space further comprises:
    the operating system kernel sending a signal conveying a system call identifier and arguments.

6. The method of claim 5 wherein the operating system kernel sending the signal to the corresponding signal handler further comprises:
the signal being one signal already used by the operating system and modified from its initial use when the preceding steps are executed;
said signal being used unmodified by the operating system kernel if the preceding steps of the method are not executed.

7. The method of claim 6 wherein the setting up the signal handler further comprises:
setting up the signal handler to comprise code for performing preprocessing or system call emulation or postprocessing.

8. The method of claim 6 wherein the setting up the signal handler further comprises:
setting up the signal handler to comprise code for virtualizing or debugging the executing process.

9. A computer system for interposing on a system call from user space, the computer system comprising:
a memory; and
a processor in communications with the memory, wherein the computer system is configured to perform a method, the method comprising:
facilitating intercepting the system call in a process executing in user space of a computer by:
setting up in the executing process of the computer, before execution of the system call to be intercepted, a signal handler comprising code for executing operations in relation to the system call to be intercepted, the code allowing the executing process to interpose itself from user space on the executing process' own system call;
performing in the executing process, before execution of the system call to be intercepted, a SELF PTRACE request which sets a system trace flag and a self trace flag in an operating system kernel of the computer, the operating system kernel of the computer supporting ptrace system calls, including a system trace, the self ptrace flag facilitating self-notifying the executing process itself whenever the executing process executes the system call; and
intercepting the system call of the executing process by executing processing in relation with the system call, the executing comprising:
upon execution of the system call, the operating system kernel verifying that the system trace flag and the self trace flag, indicative of prior execution of the SELF PTRACE request in the executing process, are set;
the operating system kernel saving system call information and sending a signal to the corresponding signal handler set-up in the executing process, the signal conveying system call information to user space;
upon reception of the signal by the executing process, starting execution of the signal handler of the executing process in user space;
at the end of signal handler execution in user space, restarting execution in the executing process at the next instruction following the intercepted system call while providing system call return information to calling code of the executing process making the system call.

10. The computer system of claim 9 further comprising before the operating system kernel sends the signal:
the kernel unsetting the system trace and the self trace flags.

11. The computer system of claim 10 in which the performing the SELF PTRACE request comprises:
saving the system trace flag and the self trace flag in a task descriptor of the executing process.

12. The computer system of claim 10 in which the performing the SELF PTRACE request further comprises:
saving the self trace flag in a task descriptor of the executing process and the system trace flag in a thread descriptor of the executing process.

13. The computer system of claim 12 wherein the operating system kernel sending the signal conveying system call information to user space further comprises:
the operating system kernel sending a signal conveying a system call identifier and arguments.

14. The computer system of claim 13 wherein the operating system kernel sending the signal to the corresponding signal handler further comprises:
the signal being one signal already used by the operating system and modified from its initial use when the preceding steps are executed;
said signal being used unmodified by the operating system kernel if the preceding steps of the method are not executed.

15. The computer system of claim 14 wherein the setting up the signal handler further comprises:
setting up the signal handler to comprise code for performing preprocessing or system call emulation or postprocessing.

16. The computer system of claim 14 wherein the setting up the signal handler further comprises:
setting up the signal handler to comprise code for virtualizing or debugging the executing process.

* * * * *